Patented Oct. 22, 1929

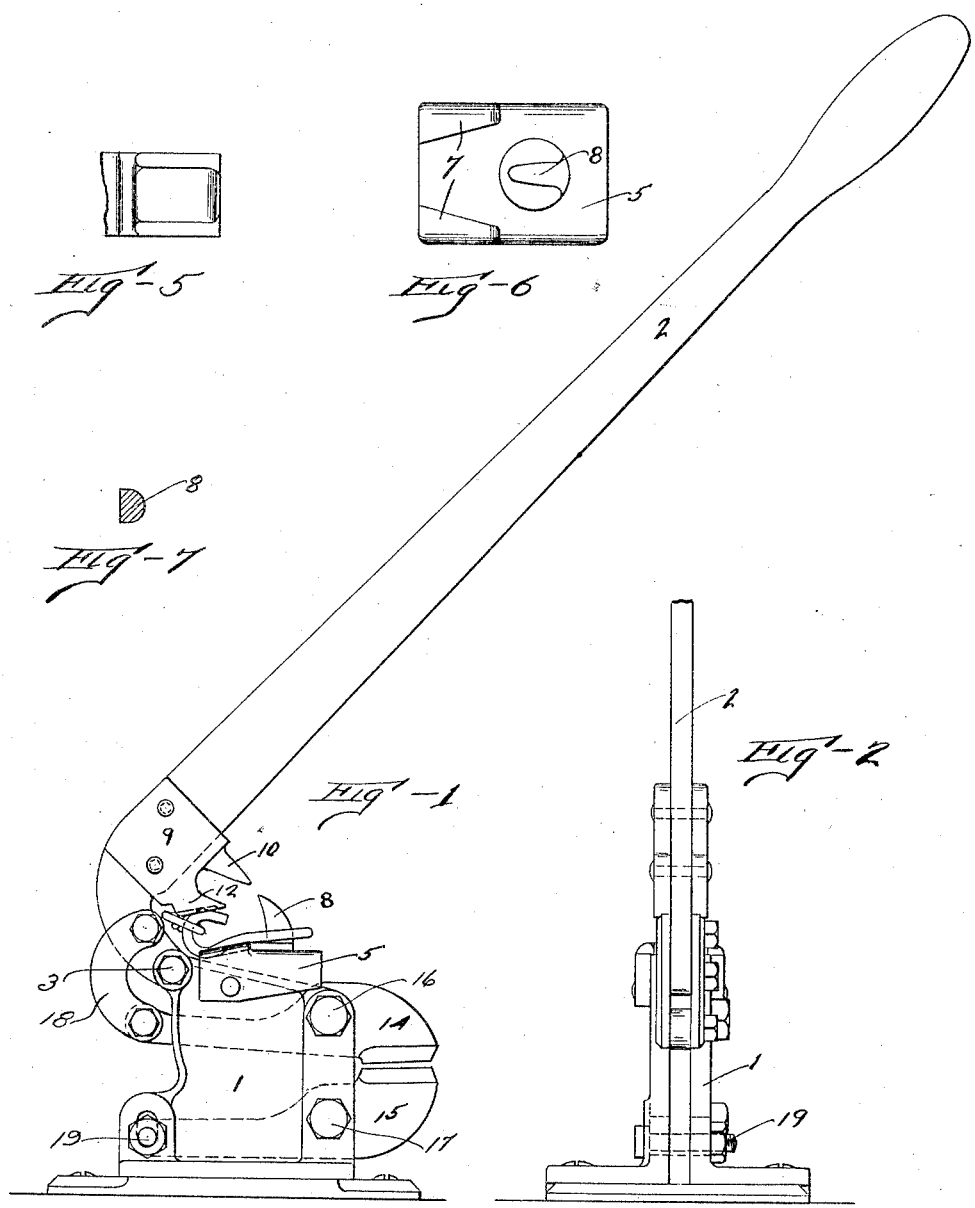

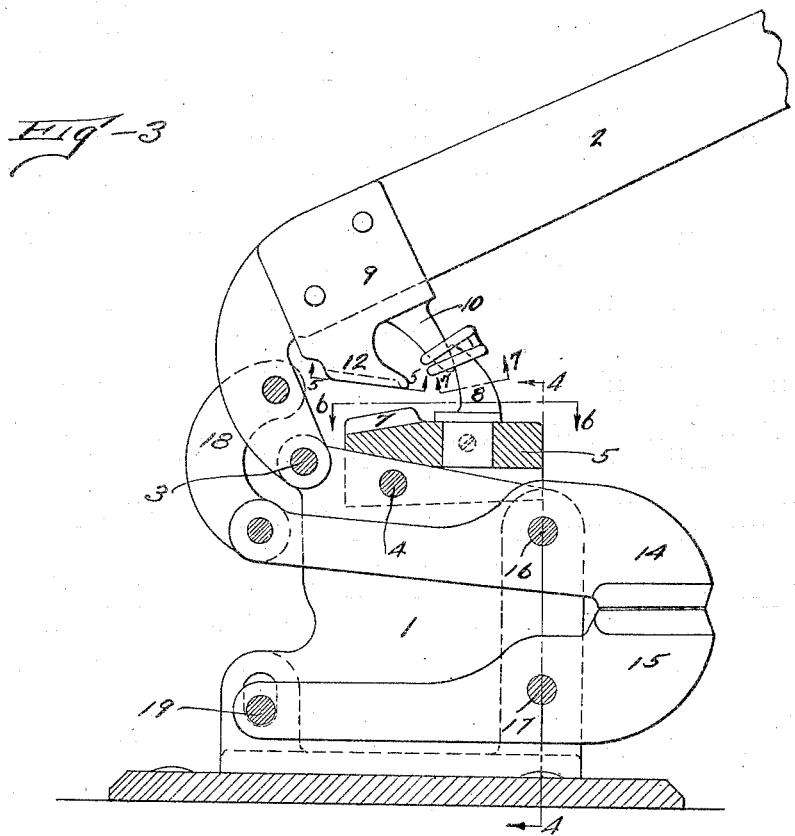
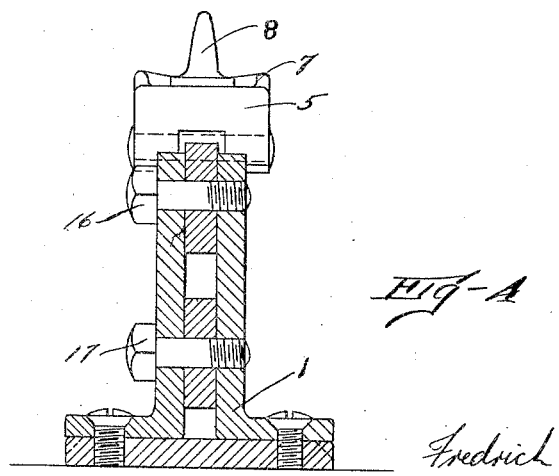

1,732,654

UNITED STATES PATENT OFFICE

FREDRICK A. OLMSTEAD, OF CLEVELAND HEIGHTS, OHIO, ASSIGNOR TO THE CHAIN PRODUCTS COMPANY, OF CLEVELAND, OHIO, A CORPORATION OF OHIO

CHAIN TOOL

Application filed June 19, 1926. Serial No. 117,100.

This invention relates to chain tools and is particularly intended for opening, closing and cutting chain links especially such as are commonly employed in the chains of automobile non-skid tire devices.

Such devices usually consist of a pair of side chains extending around with the tire, one upon each side thereof, and a number of short cross chains each extending between the side chains and around the tread of the tire.

Owing to the increasingly numerous tire sizes it has been found convenient for the retailer, instead of stocking a large number of complete anti-skid devices, to keep on hand merely a few sizes and types of chain, and to make up therefrom only as required anti-skid devices to fit the various tire sizes.

Moreover obviously while the cross chains are subject to such excessive wear as to require frequent replacement, the side chains are subject to practically no wear, so that removal of the worn cross chains and substitution of new cross chains, retaining the side chains, is the most economical practice in maintenance.

This invention has for its objects the provision of a tool capable of performing the functions named in a rapid, certain and safe manner, and with most convenience to the operator.

Particular advantages of the tool will be evident from the following detailed description taken in connection with the accompanying drawings in which Fig. 1 is a side elevation of the tool in open position showing a link about to be closed therein; Fig. 2 is an end elevation of the same tool with the handle broken away; Fig. 3 is a detailed elevation of the tool partly in section to show the conformation of the operating members thereof, showing the tool partly closed upon a link to open the same; Fig. 4 is a section along the line 4—4 of Fig. 3; Figs. 5 and 6 are detail views in the planes of lines 5—5 and 6—6 respectively of Fig. 3, showing the co-operating link closing faces of the tool; and Fig. 7 is a typical section through one of the separating teeth employed.

The principal parts of the tool are a pair of jaws comprising a base member 1 adapted to be secured upon a suitable mounting such as a floor or bench, a generally L shaped operating member 2 having a long handled arm, a bend, and a short arm pivotally mounted upon the base at 3, and link receiving members to be described, carried on the parts named.

Mounted upon the base at 4 is a link receiving member 5, provided upon each side of its rear portion with an angularly extending projection 7, the projections forming in effect a depression of converging width between them; and carrying forward of the depression a tooth 8 of generally conical and curved conformation as indicated in the drawings.

Within the bend of the member 2 as indicated Figs. 1 and 3, are mounted a member 9 terminating in a tooth 10 similar to the tooth 8, and a member 12 provided with a depression to be described.

The portions of the teeth 8 and 10 which are adjacent as the teeth move one upon the other are provided with cylindrical faces concentric about the point 3 and therefore adapted for movement, one upon the other, whereby the total sectional area of the teeth, in a generally normal plane therethrough of minimum section, is increased as the handle 2 is lowered upon the base to close the jaws.

The chain receiving members of the tool illustrated and described, are particularly designed for a type of cross chain link formed of a short length of wire, the middle portion of which is bent to form an eye of the link, the ends of the wire being brought together and bent to form a pair of smaller aligned eyes adapted to receive the single eye of the next link.

It is for this reason that the projections 7 are angularly arranged, converging to correspond with the converging link wire ends as they approach each other to form the aligned eyes to which reference has been made to prevent spreading thereof during the closing operation.

The teeth 8 and 10 are proportioned and dimensioned to open the aligned eyes of a link merely sufficiently to allow the removal of that portion of the next link secured therein;

the approximate amount of opening being shown in the link appearing in side elevation in Fig. 1.

The depression in the member 12 is of curved conformation as indicated, to close the ends of the link wire into eyes of proper curvature, the sides of the depression serving to prevent lateral spreading of the eyes during the closing operation.

In the base 1 are conveniently mounted a pair of cutting jaws 14 and 15 pivoted upon axes 16 and 17 the rear end of the cutter 14 being connected with the bent down portion or short arm of the handle by a link 18 as shown in the drawings whereby the link forms with the arm a toggle; and the rear end of the cutter 15 being adjustably positioned in the base by the bolt 19 whereby the cutting edges may be made to correspond exactly in closed position.

Operation of the members described is as follows:

To open a cross chain link it is placed upon the tooth 8 as indicated in Fig. 3, and the handle 2 lowered, forcing the teeth together through the link which owing to the thus increased sectional tooth area within the link causes it to open the required amount as the jaws reach the closed position.

To close a link it is placed upon the member 5 with its large eye around the tooth 8 so as to be positively positioned thereby longitudinally of the lever 2 as indicated in Fig. 1, the open eyes lying in the depression between the extensions 7, and the link upon which the eyes are to be closed laterally positioned in the clearance between the bend of the lever 2 and the member 12 as indicated in Fig. 1. Upon lowering the handle the ends of the link wire are engaged by the depression in the member 12 and forced to closed position about that portion of the second link within them; there being sufficient clearance provided between the adjacent portions of the members 2 and 12 to allow movement of the second link at all times.

Operation of the cutting jaws is obvious. As the handle 2 is lowered the jaw 14 is caused to close upon the jaw 15, by the link 18, the arrangement being such that the handle motion is transmitted with an increasing leverage as the jaws close.

It will be noted that by the arrangement described, I have provided a tool not only capable of performing all of the operations described, but of functioning in all operations with the work in unobstructed view of the operator. This is made possible by my employment of the L shape of lever as indicated, which gives sufficient clearance to allow positioning of the link opening and closing members in front of the lever pivot and substantially within the bend of the lever, as well as giving the most advantageous operating connection with the movable cutting jaw.

What I claim is:

1. In a chain tool, a pair of jaws comprising a base member and an operating member pivotally connected at its end therewith, corresponding generally conical tooth members one upon each of said jaws and adapted to enter the eye of a chain link and by movement one upon the other as said jaws are closed, to spread said eye to open said link, and corresponding members on said jaws adapted to receive an open chain link and to close the same as said jaws are closed the tooth member upon one of said jaw members being adapted to receive a portion of said link to position the same in the said link receiving member on the same jaw member as said link is closed between said link receiving members.

2. In a chain tool, a pair of jaws comprising a base member adapted to be secured on a support, an operating lever pivotally connected therewith, a link working member on said base member and having converging projections adapted to receive a chain link having parallel open portions and to position said link with said portions in planes parallel to that of movement of said jaws, and a second link working member on said operating lever and adapted to close upon said first named link working member as said lever is closed upon said base member, to close both of said parallel link portions equally.

In testimony whereof I hereby affix my signature.

FREDRICK A. OLMSTEAD.